June 14, 1955    M. L. LIPSICH ET AL    2,710,906
COOKING DEVICE
Original Filed April 7, 1951    4 Sheets-Sheet 1

Inventors:
Maurice L. Lipsich
Fred C. Schwancke
By: Watson D. Harbaugh
Atty.

June 14, 1955   M. L. LIPSICH ET AL   2,710,906
COOKING DEVICE
Original Filed April 7, 1951   4 Sheets-Sheet 2
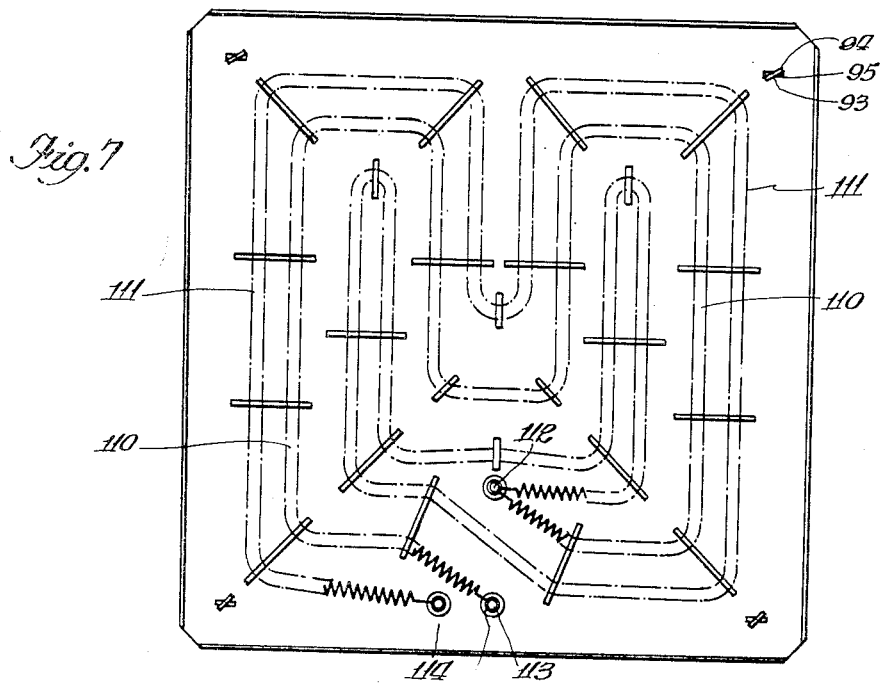
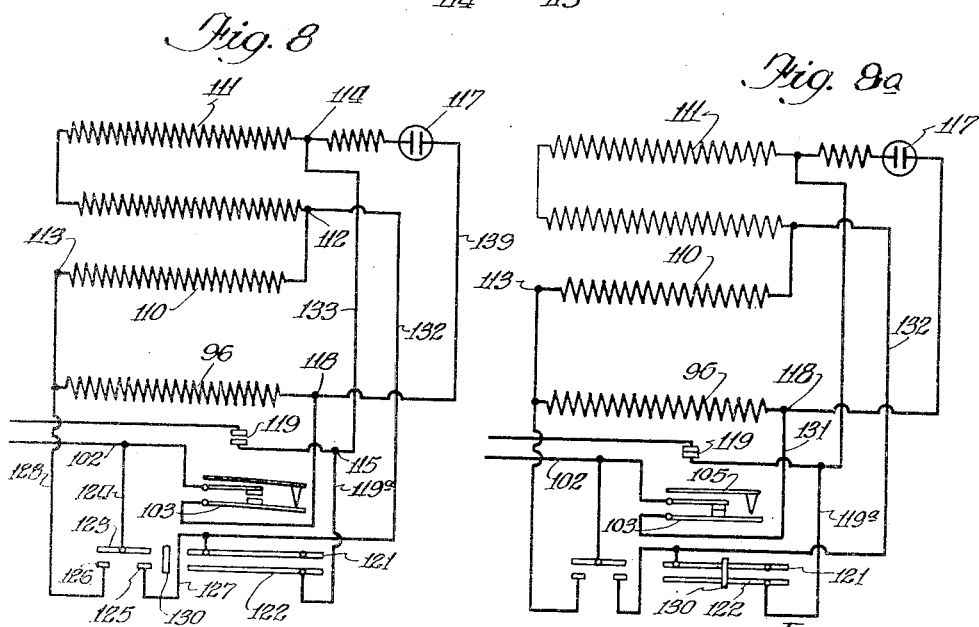
Inventors:
Maurice L. Lipsich
Fred C. Schwaneke
By: Watson D. Harbaugh
Atty.

June 14, 1955 M. L. LIPSICH ET AL 2,710,906
COOKING DEVICE
Original Filed April 7, 1951 4 Sheets-Sheet 3

Inventors:
Maurice L. Lipsich
Fred C. Schwaneke
By: Watson D. Harbaugh
Atty.

June 14, 1955     M. L. LIPSICH ET AL     2,710,906
COOKING DEVICE

Original Filed April 7, 1951     4 Sheets-Sheet 4

Inventors:
Maurice L. Lipsich
Fred C. Schwaneke
By: Watson D. Harbaugh
Atty.

United States Patent Office 2,710,906
Patented June 14, 1955

2,710,906

COOKING DEVICE

Maurice L. Lipsich and Fred C. Schwancke, Chicago, Ill., assignors to Dormeyer Corporation, Chicago, Ill., a corporation of Illinois Original application April 7, 1951, Serial No. 219,796, Divided and this application November 1, 1952, Serial No. 318,468

4 Claims. (Cl. 219—20)

The present invention relates to a food cooker and more particularly to an electric device for making waffles, grilling sandwiches and broiling steaks and the like and this application is a division application of our co-pending application Serial No. 219,796 filed April 7, 1951.

One of the objects of the invention is to provide an electrical cooking device which will bake, grill and broil various foods with equal facility and with little if any inconvenience to the user in doing these various operations in succession.

A further object of the invention is to provide a combination grill and broiler in which the heat for either operation is supplied from the same heater in the different and correct amounts of heat required for these operations.

A further object of the invention is to provide an improved construction which will accommodate food requiring a different spacing between two cooperating cooking elements over a wide range and will permit the positioning of the elements in any one of three different positions angularly with respect to each other for access and use.

Another object of the invention is to provide a waffle and grill unit which has an upper heating unit of variable output over a wide range of temperatures for other and different culinary operations.

Another object of the invention is to provide an improved waffle grill section for delivering extra amounts of heat upon occasion uniformly over a predetermined area with or without the grid in place, yet is perfectly safe to handle without danger of shocking when heater is cold and exposed.

Another object of the invention is to provide an improved switch arrangement of simple construction and operation for varying the heat and output of three heating elements and, in combination with a tell-tale light connected in series with heaters not used, to indicate when the used heaters are "on" and when the device is up to temperature ready to cook.

Another object of the invention is to provide a novel signal system by which it can be determined when the heater is "on" for any one of a number of operations and when the device is ready for operation as well as when the food is cooked sufficiently.

A further object of the invention is to provide a device of the class described which is easy to operate, simple and inexpensive to manufacture and maintain yet rugged enough to withstand abuse and lack of care.

These being among the objects of the invention other and further objects will appear from the drawings, the description relating thereto and the appended claims.

Referring now to the drawings:

Fig. 7 is a plan view of the heating element in the top member.

Figs. 8, 8a, 8b and 8c are schematic views of the control circuits and heaters for the device embodying the invention with the different settings of the switch elements shown for different operations.

The invention is characterized by novel hinge, switch and heater constructions and arrangement whereby the upper grill member operates to grill, bake and broil with the same heating elements in a device which operates also as a waffle baker upon occasion.

In one instance, the upper and lower units cooperate as a waffle maker as determined by the hinge relationship when the switch is set at a predetermined position. In this relationship the upper grill is limited in its pivoted movement to approximately 100° from horizontal to 10° past vertical for access in applying the batter and removing the waffle. Reversal of the grill plates permits the device to serve as a sandwich grill. In both instances the cooking operation is thermostatically controlled and the weight of the upper unit is in part carried by and shapes or flattens the food being prepared.

When one desires to use the device as a hot plate, the upper member is raised to its upper limit and lifted a small fraction of an inch to clear the hinge stops whereupon the upper member can be moved further and laid flat to occupy the same plane as that of the lower member.

In this position the upper element can also be used as a hot plate either with the grid element present or removed. If removed, other special cooking elements like pressure cookers, deep fat fryers and toasters can be set upon or attached to the upper element with the heater coil supporting insulators serving as a spider. On the other hand, if the grid element is left in place other cooking utensils can be set upon it as though upon a stove top.

For broiling meats or toasting bread the grid on the upper member is removed and a novel wire rack is placed upon the lower grid to carry the meat or bread slices. Upstanding loops on the wire rack engage the upper housing when it is lowered and support it well above the food as accommodated by the hinge. In this instance only the upper heating unit is employed to accomplish the broiling or toasting operation and the heat output there is much higher than that dispensed for waffle making or grilling.

Figure 1:
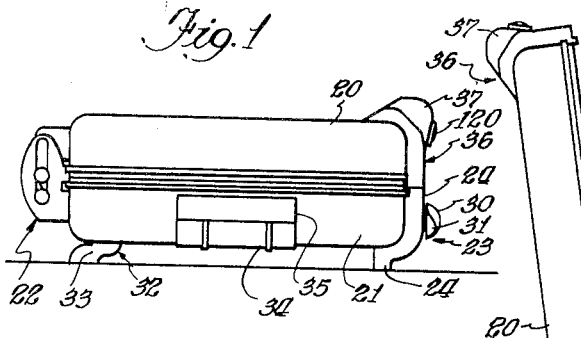
Fig. 1 is a side elevation of a combination waffle, grill and broiler cooking device embodying the invention with the upper and lower heating units located in their closed or waffle baking position.

Referring to the drawings in further detail a cooking device is shown in Fig. 1 which has upper and lower die stamped housings or shells, 20 and 21, respectively, hinged together by a hinge represented generally at 22. At the front of the lower member 21 is secured an element 23 which has a food 24 and a panel 25 (Fig. 1) which includes a slot 26 and indicia 27 thereon. In the slot is a sliding switch control member 28 movable horizontally and having a pointer 30 and a handle 31.

Figure 2:
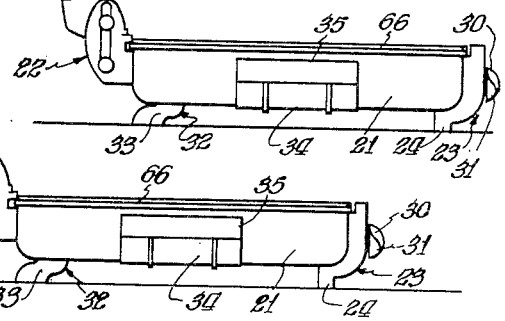
Fig. 2 is a side elevation of the device shown in Fig. 1 with the top unit raised either for removing a baked waffle, or pouring in batter for a waffle to be baked, or for receiving a sandwich to be grilled.

At the rear of the housing 21 there are provided feet 32 which are secured in place in any suitable manner and are provided with rearwardly offset extremities 33 which prevent tipping of the device when the top member is raised as shown in Fig. 2. On both sides of the lower housing 4 are secured handles 34, having horizontal positions 35 made of a material of low heat conductivity so that a user's fingers will not be burned when lifting or moving the device.

Figure 3:
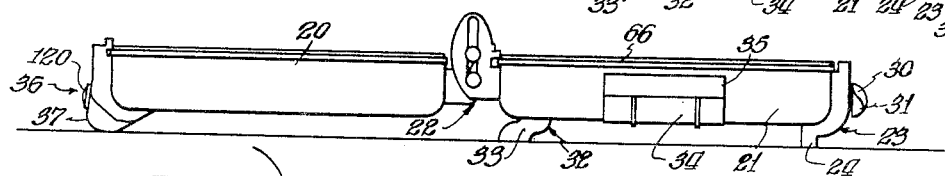
Fig. 3 is a side elevation of the device shown in Figs. 1 and 2 with the top unit moved 180° from its closed position to a position in which it is supported in the same plane with the lower unit as when the upper and lower units are to be used independently as hot plates, griddles, or heaters.

At the front of the upper housing 20 is secured an element 36, matching element 23 in style and design, with a central upstanding ear 37 serving three purposes, namely, as a handle for raising and lowering the element; as a leg when the top member is moved to the position shown in Fig. 3; and, as a housing for the tell-tale light so that it can be seen in any position to which the upper housing may be moved. The height of the handle above the top of the upper member is the same as the height of the legs 24 below the lower member so that both of the two elements are level and also level with each other.

Figure 6:
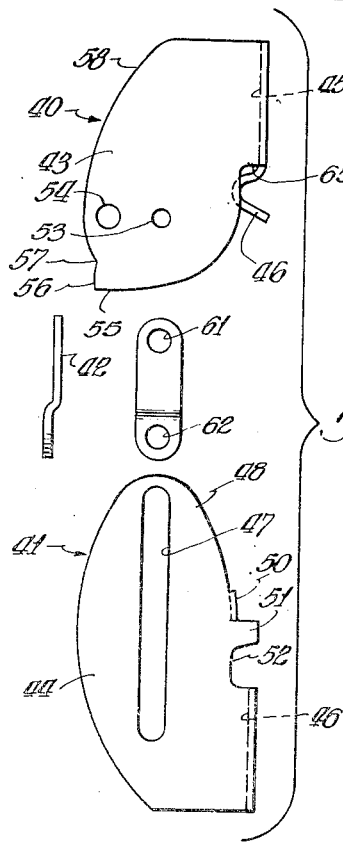
Fig. 6 is a view of the parts making up the hinge embodied in the invention.

The hinge 22 comprises two main units (Fig. 6) an upper unit 40 and a lower unit 41, two connecting links 42 and pins as hereinafter described. Both units are preferably made of heavy sheet metal and stamped to have two symmetrically arranged end portions shaped as shown at 43 and 44, which end portions are connected by band portions 45 and 46, respectively.

Figure 5:
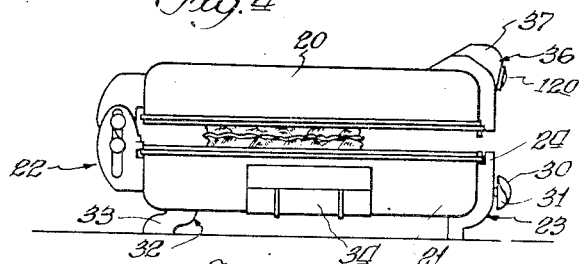
Fig. 5 is a view similar to Fig. 1 in which the upper unit is supported on a wire rack well above the lower unit for broiling purposes with the upper grid removed.

The units are secured to the respective top and bottom housings 20 and 21 along their band portions by being riveted to the back sidewall of the respective shells. It is preferred that adjacent edges of the two bands be flush or coincide with the adjacent edges of the two shells. Two frontwardly opening hook-like ears 46 are struck from the upper band 45 to extend below the lower edge of the upper shell 20 as more particularly seen in Fig. 5 where it serves to locate and secure the waffle plate as later described.

The lower end sections 44 have a long vertical slot 47 centrally therein and two ears on its front edge 48. The upper ear 50 is bent to occupy a plane parallel to the band 46 whereas the lower ear 51 serves as the upper boundary of a notch 52 which receives and secures in place the grid on the lower housing 21 as later described. The edges of the lower end sections 44 are otherwise rounded to an oval form.

The upper end section 43 has two horizontally spaced holes 53 and 54 in the lower portion thereof, and the lower front edge of the upper section is curved on a radius having the hole 53 in the center. At the rear edge the curve straightens out to provide a stop at 55, directly below the hole 54. Contiguous to, above and at approximately right angles to the stop 55 is a slightly rounding cam surface 56 whose upper end forms an appreciable recess at 57 in conjunction with the remaining rear edge portion 58, which edge portion thereabove follows the oval contour of the lower end section over this area as shown in Fig. 7.

The link 42 is offset intermediate its ends to provide appropriate clearances and is pivotally connected at its upper end to the upper member by a pin 60. The pin is received in the opening 54 in the upper members and in the opening 61 at the upper end of the link. The lower end of the link has a second opening 62 which receives the shank of a pin 63 that in turn slides in the slot 47 with the head of the pin located on the opposite side of the slot from the link.

The upper and lower sections 43 and 44 are also slidably mounted with respect to each other by pins 64, the shank ends of which are received in the holes 53 on the upper member with the other ends extending through the slots 47 and terminating in heads disposed on the outside faces of the upper member. In the assembly shown in the first eleven figures the lower members 44 of the hinge are located on the outside of the upper members 43 and the links are disposed between the members. Only the heads of the pins 63 and 64 are seen in the side elevation. Preferably the link in its resting position (Fig. 7) is disposed at approximately a 45° angle from the center line of the slot 47. This provides maximum movement between the hinge members for all purposes. The upper and lower elements 20 and 21 carry identical grids 66 preferably die cast of aluminum. The grids are perfectly square so that they may be received in the open mouths of the shells in any one of four ways with either face of the grids exposed. One face 67 of the grid is provided with the usual waffle contour or bosses 68 bounded by a land 70 and divided into four equal quadrants by cross lands 71. Around the margin of the grid a sealing land 72 is provided to prevent the batter from flowing between the grids when the waffle side of the grid is in operation. The sealing land 72 and the boundary land 70 are disposed parallel with each other and spaced a sufficient distance from each other to provide a trough 73 which has sufficient volume to entrap any extra batter which flows from between the waffle portions of the grid. Furthermore, as seen in Fig. 19 the boundary land 70 and the sealing land 72 are a little higher than the waffle bosses 68. In both grids the lands and waffle members are perfectly symmetrical on opposite sides of the cross lands 71 so that the two grids can be matched identically in four different positions. In this way the positioning of the grids in the shell elements is immaterial insofar as the making of waffles are concerned. They will always match. The lands and the waffle elements are coincident throughout their facing areas.

A horizontal flange 78 is provided marginally around each grid to engage and rest interchangeably upon the marginal edges of the shells 20 and 21. This flange 78 is disposed closer to the waffle face 67 than it is to the grill face 74. In fact, the flange 78 is so located that it is equidistant from the planes defined by the tops of the waffle bosses 68 and the flat face 74 of the grid.

With this arrangement the tops of the waffle element 68 and the grill face 74 are disposed at the same depth in the shells whenever they are turned inwardly for identical engagement with the thermostatic control as described herein a little later.

Considering now the heating elements, it will be observed from Figs. 21 and 22 of the drawings that in each of the shells 20 and 21 heating elements are supported on secondary elements or plates 92 as secured in place by twisted ears 93 received through slots 94 with the plate resting on shoulders 95. In the lower shell 21 the heating element 96 comprises a coiled wire stretched slightly and wound back and forth in a zig zag or serpentine manner to cover a large area as held and supported by conventional ceramic insulating elements 97. This provides a wide area of applied heat. On the bottom of the shell a Bakelite housing 98 serves as a junction box for the lead-in cord 100 and the electrical connection with the heaters and leads.

Preferably the wires are secured to terminals 101 insulated from the shell and one of the terminals is connected by a lead 102 to one side of a combination thermostat and cutoff switch 103 which is responsive to the heat of the lower grill through a metal slug member 104 disposed in heat exchange contact with a bi-metal element 105 that moves one pole of the switch with respect to the other. The construction and operation of the switch and associated constructions are more particularly described hereinafter.

As already mentioned heretofore, the flange 78 upon the grid locates the grill face 74 and the extremities of the waffle studs 68 at a predetermined depth in the housing, depending upon whichever is turned inwardly. The upper face of the metal slug member 104 has an upper limit of location well above this depth. A slot 106 is provided in the mounting bracket for the switch which permits the slug member 104 to yield downwardly when the grid is mounted in place yet maintain intimate heat exchange contact between this slug and the grid under the tension of a spring 107 which not only urges the slug member 104 to its upper limit, but it also loosens the grid from its resting position when the latch is released. Thus, whenever the apparatus is operated under the control of the thermostat, the heat developed in the grill by the heater element is effective upon the bi-metal 105 by heat exchange contact through the slug member 104 to open the switch when the heat reaches a predetermined temperature and to release the switch and permit it to close when the heat of the grid falls below another predetermined temperature. Movement of the lever 31 varies or adjusts the bi-metal and switch for selected temperature through a cam 99 and follower 109 that changes the position of the switch with respect to the bi-metal.

The upper secondary plate 108 has on it two heaters. One of the heaters is an outside coil 110 which is identical in its electrical characteristics with the heater coil 96 in the lower housing 21. Each preferably has 4½ ohms resistance and when connected in series with each other they develop approximately 1200 watts. The other heater 111 is equivalent to two heaters connected in series like the coils 96 and 110. Sometimes in this description it is referred to as two heaters to further a better understanding of the circuits. One end of the heater 111 is connected to a terminal 112 in common with one end of the heater 110, the other end of the heater 110 being connected to the terminal block 113 and the other end of the heater 111 being connected to the terminal 114 which in turn is connected to the other side of a line at 115 through an on and off switch 119. The electrical connections between the terminal block in the lower shell and the terminal block in the upper shell are carried from one to the other at the rear through a flexible wire coil protector 129 located between the hinge elements.

The coils 110 and 111 are supported upon ceramic insulators 116, similar in their mounting to those 97 used in the lower housing with the coil 110 wound near the outside boundary of the plate 108 to a point near the top where it is directed inwardly to form an inside loop so that substantially even distribution of heat from the coil is attained for the grill. On opposite sides of the coil 110 and spaced from it the heater 111 is disposed in two loops approximately equidistant from the heater 110 throughout their adjacent portions. A pilot light arrangement 117 comprising a neon light and a 100,000 ohm resistance connected in series is connected between the post 114 and the other side of the thermostatically controlled switch 103 at 118. This latter connection is in common with one end of the heater 96, the other end of which is connected to the post 113. The telltale light 117 is visible at an opening through a ruby window 120 on the upper front panel 36 of the device.

Before describing the detailed construction of the control switch 103, it might be well to consider the arrangement of parts represented in the schematic drawing of the switch and the circuit as shown in Fig. 13. Two parallel contacts 121 and 122 are shown with the contact 122 connected to the post 114 and the contact 121 connected to the post 112. In line with, but spaced from the contact 121 is a third contact 123 connected to one side of the line and one side of the switch 103 through a wire 124. Opposite the elongated contact 123 and spaced therefrom are two independent contacts 125 and 126. The contact 125 is permanently connected to the contact 121 by a lead 127 and the contact 126 is connected to the terminal post 113 by a lead 128. A sliding bridge 130 moves along the contacts and as shown in Fig. 8, is in its "off" position in which no contacts are engaged or bridged. The switch 119 is held "open" when the bridge 130 is in "off" position as controlled by a cam (not shown).

Referring to Fig. 8a, the bridge 130 has been moved to the right, i. e. to the waffle baking position in which contacts 121 and 122 are bridged. This closes the switch 119 and places the lower heater 96 and the upper heater 110 in series with each other and with the thermostatic switch 103. In this position of the bridge the path of electrical current is shown by heavy lines, one side of the line 102 being connected to one side of the now normally closed switch 103 and the other side of the switch being connected to the heaters 96 and 110 with the other end of the heater 110 connected to the contact 121 by a lead 132, the bridge closes the circuit to the other side of the line through the contact 122 and the lead 119a and switch 119. With this circuit the heat in the bottom shell and the heat in the upper shell will be identical since the two heaters are identical and this heat will be controlled by the action of the bi-metal upon this switch 103. In this connection it will be noted that the bars 121 and 122 are elongated so that the bridge 130 will engage both throughout a wide range of movement handle to which movement the bridge is linked to control the setting at which the switch elements will be opened by the bi-metal.

With this circuit the tell-tale light 117 is placed in series with the switch 103 and the other side of the line through the heater 111. Thus when the heaters are turned to waffle baking position the light goes "on" instantly and goes "out" when the switch 103 is opened, thereby indicating that the waffle grids are right for baking operations. This light will stay "off" until the switch is closed again as when the waffle grids are loaded with cold batter. Thereafter the light will stay "on" until the baking operation is completed, whereupon the user is signalled by the light again going "out" that the waffle is ready for removal.

Figure 8B:
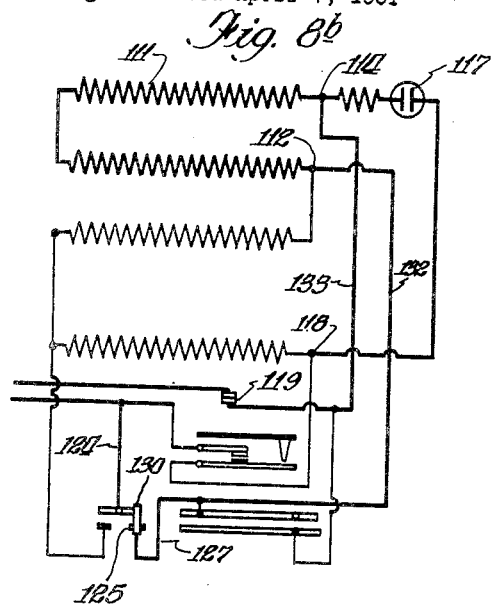

Referring to Fig. 8b, the bar 130 has been moved to the "high broil" position. When the device is used as a broiler the upper grid is removed so that the heaters radiate their rays against the food directly without interruption of current or intervention of any other element. In this position of the bar 130 the thermostatic switch is not in operation. It remains open. The heater 111 having one end connected at 114 to one side of the line through switch 119 works in series with heater 112 whose other end is connected to the other side of the line through the leads 132 and 127, the bar 130, the lead 124. With this circuit the tell-tale light 117 is connected in parallel with the heater 111 from the post 114 to the post 112 through the heaters 96 and 110. Thus in the "high broil" position, the tell-tale light is "on" as long as the heater 111 is "on," and thereby informs the user that the device is using current.

Figure 8C:
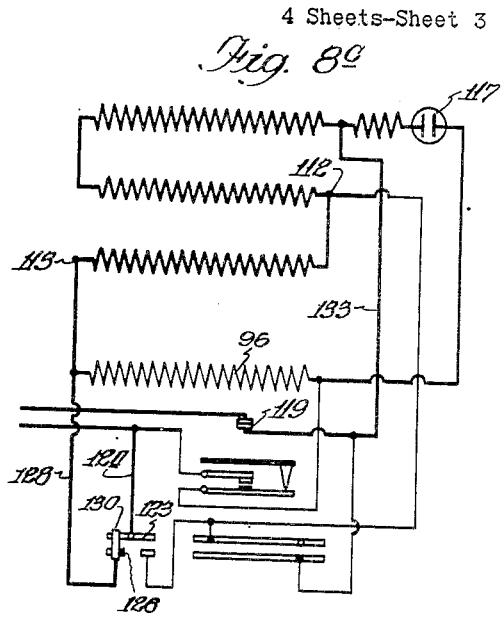
Figure 9:
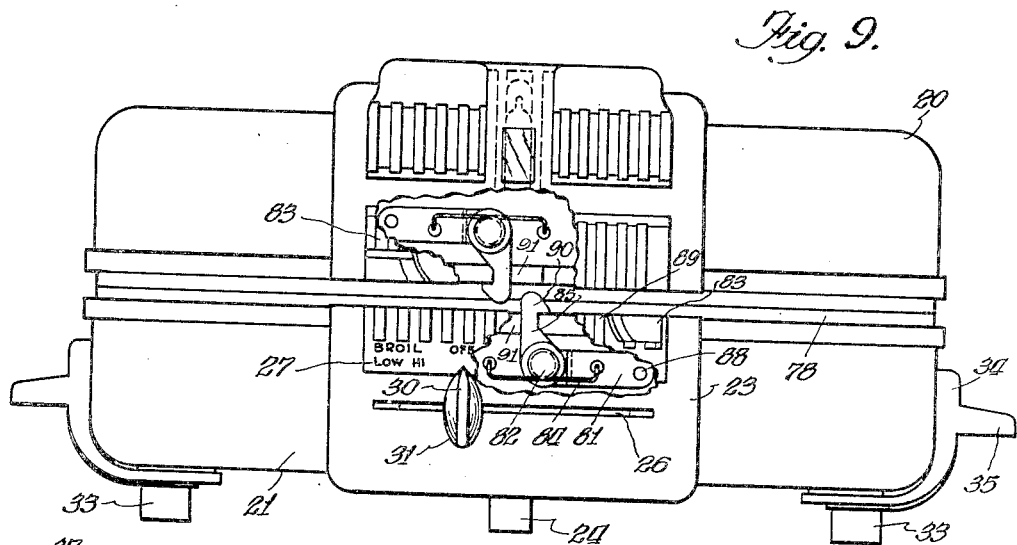
Fig. 9 is a front elevational view partially broken away of the control panel on the front of the device.
Figure 9A:
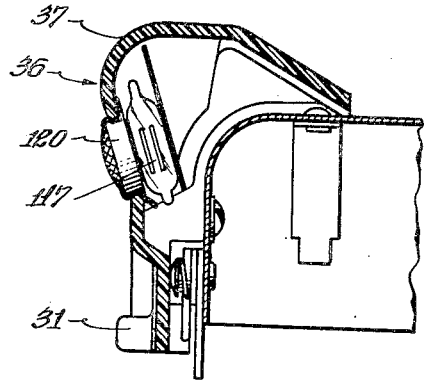
Fig. 9a is a side elevation of the upper handle member showing the mounting of the indicator light.
Figure 10:
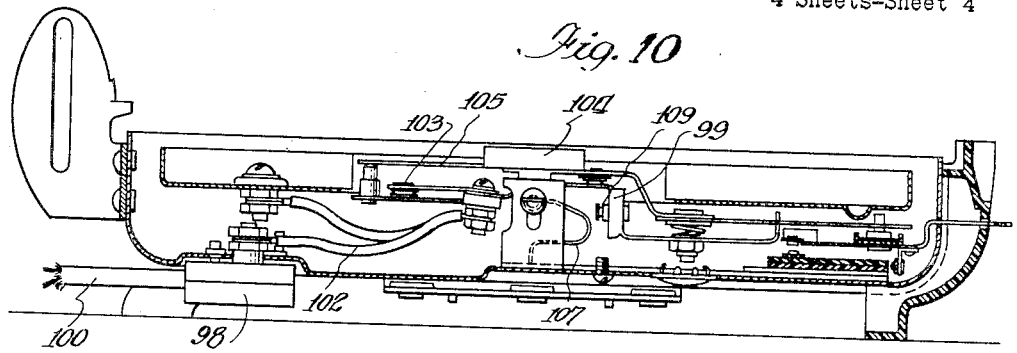
Fig. 10 is a sectional view of the lower unit including the control switches as taken on a vertical plane through the middle of the lower unit.
Figure 11:
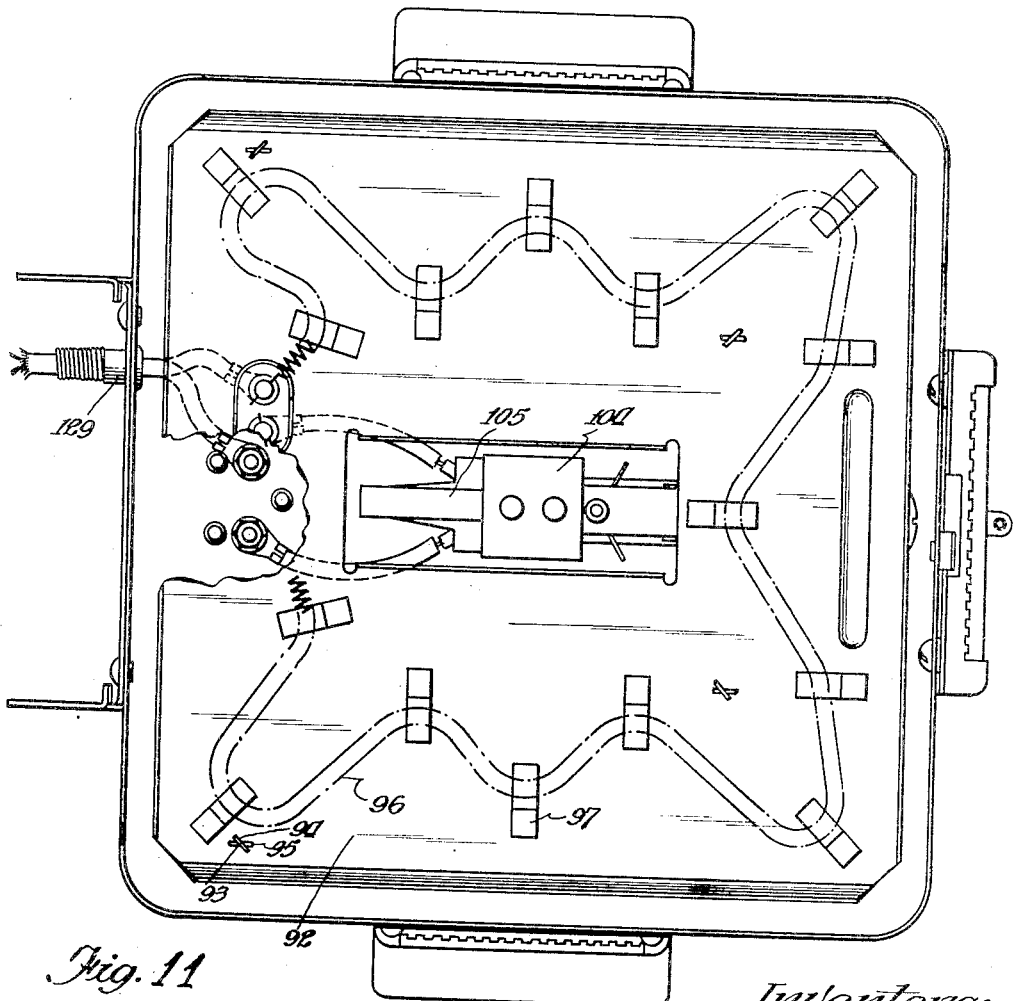
Fig. 11 is a plan view of the lower unit with the grid removed.

Referring to Fig. 8c, the bar 130 is located in the "low broil" position where it bridges the contacts 123 and 126. This bridging places the three heaters 110, 111 and 96 in series at 112 and 113 to draw approximately 800 watts thereby giving a low broiling temperature. The circuit runs from one side of the line through the lead 124 to the bridge 130 and through the lead 128 to the binding post 113. This binding post 112, now being dead, the current flows through the heater 111 to the other side of the line through the lead 133 and switch 119. Here again the pilot light 117 is in parallel with the energized heaters as connected between the binding post 114 and the binding post 113 through the idle lower heater 96, so that the tell-tale light is on continuously while the heaters are energized.

In all three of these instances it will be noted that the tell-tale light is in series with one or more of the heaters which are not energized. The load of the tell-tale light being so infinitesimal, there is no appreciable energization of the heater with which it is in series. However, the tell-tale light serves in all instances to perform the proper function of appraising the user when any of the heaters are on, and when the grill is up to waffle baking temperatures, after having been on to indicate that the heaters were supplying heat to the waffle grills.

In the embodiment shown four leads pass through their protective conduit 129 between the two housings, namely the pilot light lead 139, the lead 132, the lead 133 and the lead terminating on the post 113 which interconnects the heaters 96 and 110.

Figure 4:
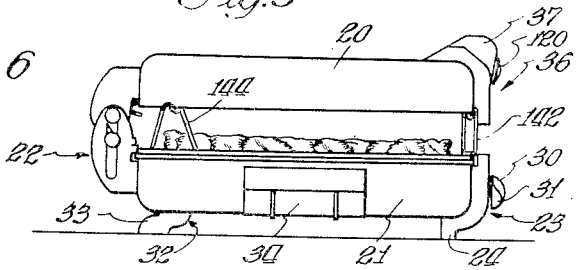
Fig. 4 is a view similar to Fig. 1 in which the upper and lower units cooperate to grill a sandwich as when the upper unit is supported above the lower unit by the sandwich itself.

As will be seen in Figs. 1, 2 and 4 it will be apparent that the tell-tale light is visible to the user regardless of the position the upper unit is disposed in for cooking operations, not only to apprise the user of the readiness of the device for baking operations but also whether or not the device might be hot if otherwise a person would try to investigate by touching it.

Consequently, to those skilled in the art it is apparent from the description and drawings how the objects and results are accomplished and how various and further constructions and arrangements can be made without departing from the spirit of the invention, the scope of which is commensurate with the appended claims.

What is claimed is:

1. In a device of the class described, the combination of upper and lower housings pivoted together, a heating element mounted in the lower housing for radiating heat upwardly, two heating elements like the first heating element mounted in the upper housing and connected in series with each other and the lower heating element, a thermostatic switch, a tell-tale light connected in parallel with said heaters, one connection between the heaters and the tell-tale light being connected to one side of a house circuit, and the other connection being connected to the other side of the house circuit through said switch, a triple position triple pole switch, two of the poles on one side being connected together and to said other side of the house line, and the other pole on said one side being connected to one of the connections between the two heaters and to one of the poles on the other side opposite one of said two poles, the other of said poles opposite said two poles being connected to the connection between the lower and upper heaters and the third pole on said opposite side being connected to said other side of the house circuit.

2. The combination called for in claim 1 in which the pilot light connected in parallel with said three heaters is connected with one of the connections thereof extending between said housings whereby the pilot light is located at the front in said upper housing.

3. The combination called for in claim 1 in which the tell-tale light is always connected across the house circuit in series with the thermostat switch and in parallel with all the heaters irrespective of their energization.

4. The combination called for in claim 1 in which the tell-tale light is connected in parallel with all the heaters with said other connection extending between said housing whereby whenever any of the heaters are energized the light is always energized through the remaining heaters not in use.

References Cited in the file of this patent

UNITED STATES PATENTS

| | | |
|---|---|---|
| 1,749,173 | Wells | Mar. 4, 1930 |
| 2,136,764 | Smith | Nov. 15, 1938 |
| 2,342,077 | Jepson | Feb. 15, 1944 |
| 2,403,824 | Newell | July 9, 1946 |